United States Patent
Arnarson et al.

[11] Patent Number: 5,871,078
[45] Date of Patent: Feb. 16, 1999

[54] AUTOMATIC INFEEDER DEVICE WITH REJECT

[75] Inventors: Hordur Arnarson; Helgi Hjalmarsson, both of Reykjavik, Iceland

[73] Assignee: H.F. Marel Ltd, Iceland

[21] Appl. No.: 760,880

[22] Filed: Dec. 9, 1996

Related U.S. Application Data

[63] Continuation-in-part of Ser. No. 242,956, May 16, 1994, Pat. No. 5,582,283.

[51] Int. Cl.[6] ............................. B65G 43/08; B65G 47/46
[52] U.S. Cl. ......................... 198/358; 198/360; 198/367; 198/368; 198/460.1
[58] Field of Search ..................................... 198/358, 360, 198/367, 368, 460.1, 459.1, 459.7, 463.6, 367.1, 447, 460.3, 357

[56] References Cited

U.S. PATENT DOCUMENTS

| | | | |
|---|---|---|---|
| 2,470,922 | 5/1949 | Dunn ........................................ | 198/357 |
| 3,235,101 | 2/1966 | Milhaupt .............................. | 198/451 X |
| 3,469,674 | 9/1969 | Mathews et al. . | |
| 3,608,698 | 9/1971 | Crall ........................................ | 198/358 |
| 3,815,723 | 6/1974 | Wright et al. ........................... | 198/357 |
| 4,010,841 | 3/1977 | Bonzack .................................. | 198/357 |
| 4,043,442 | 8/1977 | Greenwell et al. .............. | 198/463.6 X |
| 4,240,538 | 12/1980 | Hawkes et al. ...................... | 198/451 X |
| 4,261,456 | 4/1981 | Scarpa et al. ......................... | 198/459.7 |
| 4,494,644 | 1/1985 | Rizzo, Sr. .......................... | 198/463.6 X |
| 4,792,033 | 12/1988 | Iwata et al. .............................. | 198/357 |
| 4,938,082 | 7/1990 | Buckley et al. ..................... | 198/460.1 |
| 5,197,607 | 3/1993 | Hakansson . | |

FOREIGN PATENT DOCUMENTS 1 455 775  11/1976  United Kingdom ................... 198/357

*Primary Examiner*—Karen M. Young
*Assistant Examiner*—Thuy V. Tran
*Attorney, Agent, or Firm*—Pillsbury Madison & Sutro, LLP

[57] ABSTRACT

An apparatus and method for depositing objects at separated locations on a movable belt. The device includes at least one channel through which objects enter the apparatus. A sensor measures separation between adjacent objects approaching the apparatus and a reject mechanism prevents object that are too close to adjacent objects from entering the apparatus. Each channel includes a plurality of gates disposed therein. These gates operate sequentially to incrementally move the objects individually through the channel towards the movable belt. A sensor locates empty spaces along the movable belt, into which the objects are deposited. The movable belt is usually part of a conveyor system and may be a slotted belt or a smooth belt.

23 Claims, 2 Drawing Sheets

AUTOMATIC INFEEDER DEVICE WITH REJECT

This application is a continuation-in-part of application Ser. No. 08/242,956, filed on May 16, 1994 now U.S. Pat. No. 5,582,283.

BACKGROUND OF THE INVENTION

1. Field of the Invention

The present invention relates to a device for inputting objects to a system. More particularly, the present invention relates to a device for organizing objects from a conveyor on a movable belt and further including a reject mechanism for rejecting objects moving along the conveyor that are too close to adjacent objects moving along the conveyor.

2. Description of the Related Art

In feeding systems such as those used in conjunction with grading equipment that classifies objects based on either weight or appearance (such as computer-vision systems), it has been necessary for the individual objects to be fed to the equipment in a single line with a certain minimum distance between adjacent objects to ensure an accurate classification of the objects and also to provide the ability to direct the object to a desired location after it has been classified. The objects usually have a random orientation when fed to the system, and may be spaced too closely to each other to permit them to be accurately place in the system.

Today, one manner of accomplishing this single-line infeeding is to have an operator manually feed the objects to a feeding system or directly to a grading system. Such manual infeeding is labor-intensive and correspondingly very expensive. It is also easy for an operator to be careless and deposit more than a single object at a time to a grading system, thus producing errors in correct grading of the objects. As a result, feeding speed is limited.

SUMMARY OF THE INVENTION

The goal of the present invention is to overcome the problems with manual infeeding by providing a system that automatically feeds grading equipment or other equipment where it is necessary to have the objects separated from one another and further rejects excess objects when objects moving into an automatic infeeding device are not separated by a required minimum distance. In this manner, labor costs are decreased and processing speed and accuracy can be increased.

The present invention is an apparatus and method for effectively organizing objects to be placed on a movable belt. The present invention ensures that objects are deposited at separated locations on the belt.

The present invention is directed to an apparatus that inputs objects to a conveyor system, including at least one channel, having an exit therefrom, with the objects entering the apparatus and moving toward the exit to the conveyor system. The system also includes means for determining the presence of the objects in the channel. Disposed in the channel are means for controlling flow through the channel and allowing each object to exit the channel individually through the exit and to be deposited in a predetermined area on the conveyor system.

The present invention is also directed towards the method of depositing objects on a movable belt. Objects move through at least one channel having a plurality of gates disposed therealong. The objects move toward an exit from the channel toward the movable belt, with the movement of the objects being controlled by the gates in the channel. The presence of objects in the channel is sensed by a sensor disposed along the channel. Positions for objects along the movable belt are sensed by a sensor disposed along the movable belt. The objects are moved through the channel by sequentially opening and closing each of the gates, starting with the gate closest to the movable belt and advancing towards an entrance to the channel. One object is deposited in an appropriate position on the movable belt separated from other objects. The entire process is repeated until all objects have been deposited on the movable belt.

The present invention is also directed to an apparatus for inputting objects to a conveyor system wherein the apparatus includes structure defining an object path having an exit therefrom, the objects moving along the path toward the exit to the conveyor system. An object separation measuring device provided along the path determines the distance between adjacent objects moving along the path, and an object reject mechanism responsive to the object separation measuring device is provided to remove objects from the path which are separated from adjacent objects in the path by less than a prescribed minimum distance, including objects actually physically stuck to adjacent objects. Alternatively, or in addition, a camera could be used as a sensor and objects having an improper shape would be removed from the path.

The present invention also is directed to a method for depositing objects on a movable belt wherein the objects move through a channel having a terminal exit and a reject exit and a gate disposed along the channel adjacent to the reject exit. The objects move through the channel toward the terminal exit and to the moveable belt. The distance between mutually adjacent objects moving in the channel is sensed by a sensor disposed along the channel, and the gate is open to expose the reject opening and to deflect an object through the reject opening when the distance sensed between the object and the adjacent objects in the channel is less than a prescribed minimum distance.

Other objects, features, and characteristics of the present invention, as well as the methods of operation and functions of the related elements of the structure, and the combination of parts and economies of manufacture, will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
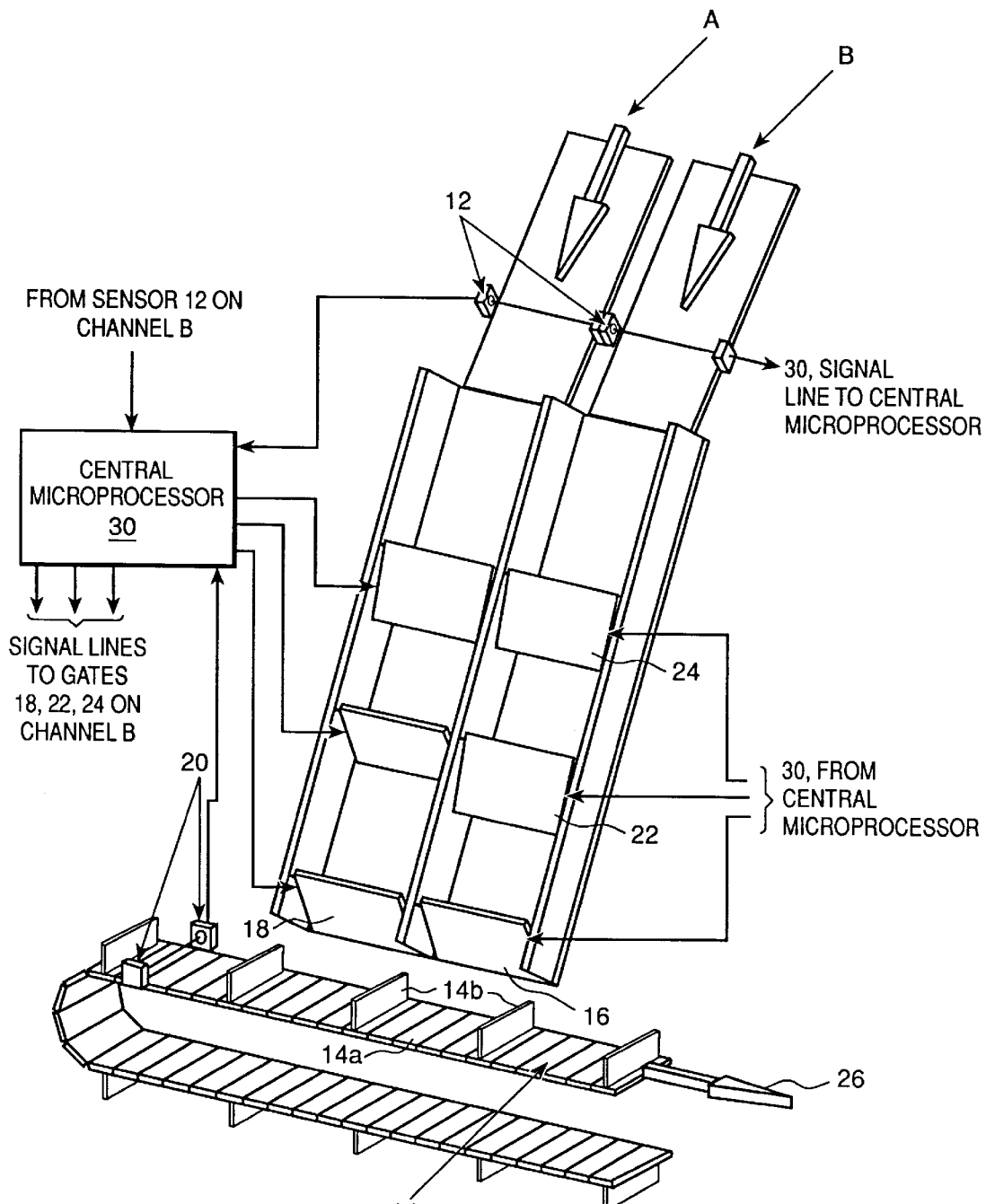
FIG. 1 is a perspective view of a first embodiment of the present invention.

A first embodiment of the present invention, as depicted in FIG. 1, includes a first channel A and a second channel B. It is also possible to have any other number of channels. For example, one to six channels, or even more, may be employed. Disposed along each channel is sensor 12 for determining the presence of an object in the channel. Each of the objects being input to channels A and B are to be deposited in one of the individual spaces 14a between dividers 14b on slotted belt 14. Of course, belt 14 need not be slotted with dividers as shown in FIG. 1. It is possible that belt 14 be a smooth belt. Sensor 20 senses the presence of dividers 14b along belt 14, with the dividers indicating the position of spaces 14a. Sensor 20 could also be used to locate empty spaces by sensing the presence or absence of objects in the spaces 14a.

Of course, it is possible to use more than a single sensor along each channel. Sensors could be disposed between adjacent gates to signal when an object is present therebetween. Such sensors could be used to more accurately control opening and closing of gates 18, 22, and 24. Sensors between gates would ensure that only a single object was trapped between adjacent gates. Furthermore, such sensors could be used to determine the speed of the objects passing through the channels, and thus more effectively control opening and closing of the gates.

Each of channels A and B includes a plurality of gates disposed therealong. In the embodiment shown in the FIG. 1, three gates 18, 22, and 24 are used, but anywhere from two to five gates, or more, may be used in each channel. The preferred number of gates is between two and five, with the number depending upon such factors as the rapidity of objects being input to channels A and B, the speed of slotted belt 14, etc. Gate 18, in each channel, blocks lower end 16 of each channel. Gates 22 and 24 are disposed sequentially between gate 18 and sensor 12.

In the preferred embodiment, channels A and B are inclined so that objects move via gravity towards lower end 16. It is also possible that the channels be horizontal. In such an embodiment, means must be provided to move the objects towards belt 14. The means for moving the objects is, for example, a conveyor belt disposed in each channel. It is also possible, in the horizontal design, to eliminate the gates and instead using a plurality of conveyor belts disposed along each channel. The channels may also be vertical.

Gates 18, 22 and 24 are controlled by central microprocessor 30. Central microprocessor 30 receives signals from sensors 12 and 20, with the signals from sensors 20 identifying dividers 14b on slotted belt 14 and signals from sensors 12 alerting central microprocessor 30 to the entry of objects into channels A and B. Central microprocessor 30 outputs signals to the gates 18, 22 and 24 disposed in each channel A and B, with the signals to the gates controlling the opening and closing thereof.

In the preferred embodiment of the present invention, sensors 12 and 20 are optical sensors. However, other type of sensors are also possible, such as capacitive/magnetic sensors, ultrasonic sensors or force sensors.

The operation of the above system will now be described. Objects are fed to channels A and B in the direction of the arrows along channels A and B. In most cases, the objects are fed to the channels on a conveyor system (not pictured) in such a manner that the objects arrive as a single layer and not on top of one another.

Objects in channels A and B are detected by sensor 12, which signals the presence of each object to central microprocessor 30. The first object to enter a channel will proceed unimpeded all the way to gate 18, which is closed. The second object to enter the same channel will only go as far as gate 22, which closes after an object is impeded by gate 18. Gate 24 closes once an object rests against gate 22. Central microprocessor 30 controls gates 18, 22 and 24 so as to allow only a single object to access the space between adjacent gates.

Slotted belt 14 continuously runs proximate gate 18, so that when gate 18 opens, the object disposed next to gate 18 will be deposited to a space 14a between adjacent dividers 14b. The opening of gate 18 is controlled by sensor 20 detecting an empty space between dividers 14b and signalling the presence of same to central microprocessor 30. If sensor 20 determines that an object is already present in a space on slotted belt 14, gate 18 will not open, and thus, the present invention will prevent more than a single object form being deposited in any space on slotted belt 14.

Once gate 18 opens and the object is deposited on slotted belt 14, gate 18 closes, and gates 22 and 24 are sequentially operated so as to advance objects trapped therebehind one gate closer to slotted belt 14. That is, an object trapped behind gate 22 advances so that it is now behind gate 18 and an object trapped behind gate 24 advances to being behind gate 22. Objects in all channels, in this case, both A and B, are advanced by the sequential opening of gates 18, 22 and 24, until the object attains a position on slotted belt 14.

Slotted belt 14 runs in the direction of arrow 26. As noted above, a single object is positioned in each space on slotted belt 14 by the sequential operation of gates 18, 22 and 24 by central microprocessor 30. It is also possible that belt 14 be a smooth conveyor-type belt. In such an embodiment, gate 18 would function so as to open at specific time intervals timed with movement of the belt in order to deposit one object in a specified range or length of belt 14.

Both channels A and B operate in the same manner. That is, gates 18, 22 and 24 in each channel are sequentially operated so as to advance objects in both channels toward slotted belt 14. In the pictured embodiment, sensor 20 could signal central microprocessor 30 whenever two consecutive empty spaces 14a are detected. Then, microprocessor 30 signals to gate 18 in both channels A and B, opening the gates and depositing objects in the two consecutive open spaces. However, with such operation, it is possible to allow spaces 14a to remain empty should one of channels A and B be empty.

Alternatively, as microprocessor 30 receives an indication from sensor 20 of each empty space, microprocessor 30 determines which channel has the greatest number of objects therein by determining how many gates are closed in each channel. The channel with the most closed gates has the most objects therein waiting to be fed onto movable belt 14. Microprocessor 30 will control the gates in the channel with the most objects to sequentially open, as described above, to deposit an object from the channel to the identified empty space.

It is also possible that sensor 20 is not necessary if it is known that spaces 14a between dividers 14b will be empty as slotted belt 14 moves past lower end 16 of channels A and B. In such an embodiment, the opening of gates 18 is keyed to the speed of belt 14.

Figure 2:
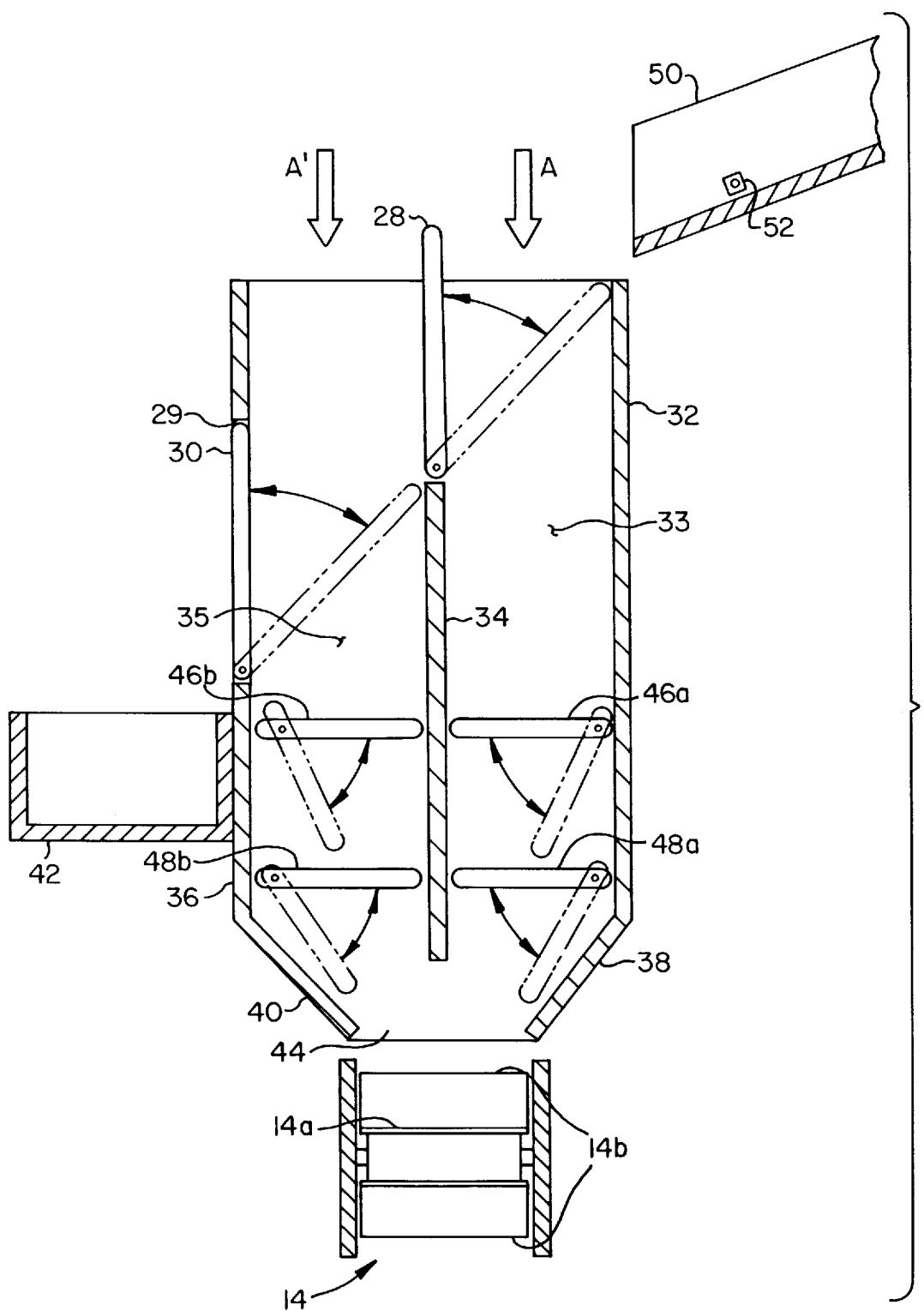
FIG. 2 is a side view, partially in section, of a second embodiment of the present invention.

FIG. 2 shows a side cross-sectional view of a second embodiment of an infeeding device according to the present invention. The infeeding device of FIG. 2 includes a reject mechanism, the purpose of which is to ensure that a sorting device, for example, of the type describe above, is not overloaded with objects to be graded. When objects are introduced into the grading unit more rapidly than they can be accurately sorted, i.e., when objects enter the unit stuck to or too close to one another or when the conveyor is full, the reject mechanism removes the excess objects from the system. Alternatively, or in addition, objects entering the unit which have an improper shape are rejected from the system.

In this infeeding device, a pair of channels A and A' are positioned in a back-to-back configuration below the end of a chute or a conveyor 50. As with the previous embodiment, more or less than two channels may be provided, and the channels can be arranged in a side-by-side configuration instead of, or as well as, a back-to-back configuration. The cross-sectional end view of FIG. 2 shows only one pair of channels A and A'. It can be appreciated, however, that more than one pair of channels can be provided in a side-by-side configuration.

Within each channel A and A', a pair of gates 46a, 46b and 48a, 48b, respectively, are provided for selectively permitting objects deposited within the channel to drop through the channel as with the previous embodiment of the automatic infeeder device. Gates 46a, 46b, 48a, 48b are pivotally mounted within their respective channels for movement between a closed position shown in solid lines and an open position shown in phantom lines. As with the previous embodiment, gates 46a, 46b, 48a, 48b are controlled by a central microprocessor (not shown) so as to deposit one object per open space 14a on the conveyor 14. In the embodiment shown in FIG. 2, a pair of gates is shown in each channel. It will be appreciated, however, that more or less than two gates can be provided along each of the channels A and A' as with the previous embodiment.

Channels A and A' are preferably defined by a flat base wall 32 and 36, respectively, and first and second side walls. In the cross-sectional view shown, only one of the side walls for each channel is shown; i.e., side wall 33 for channel A and side wall 35 for channel A'. In the back-to-back configuration shown, dividing wall 34 separates channel A from channel A'.

To selectively direct objects falling off the end of chute 50 into one of channel A or A', this embodiment preferably includes a directing gate 28 which extends vertically above the dividing wall 34. Directing gate 28 is pivotally mounted at the bottom portion thereof so as to be pivotable between the vertical position shown in solid lines and the position shown in phantom whereby the directing gate covers channel A.

With deflecting gate 28 in the vertical position, an object falling off the end of chute 50 will fall into channel A and be deposited on gate 46a. After an object has been deposited into channel A, the deflecting gate 28 pivots to the position shown in phantom which closes channel A so that the next object falling from the end of chute 50 will be deflected into channel A'. Movement of the objects through channels A and A' can be controlled by gates 46a, 48a and 46b, 48b, respectively, in the manner described in the previous embodiment. An object separation sensor 52 is provided in chute 50 to determine the distance between objects and the length of individual objects in chute 50. Alternatively, a sensor could be provided in each channel itself at a position before the first gate. Sensor 52 is connected to the central microprocessor (not shown). As with the previous embodiment, it is preferable to provide sensors associated with gates 46a, 46b, 48a, 48b in channels A and A' to determine when an object has been deposited into channel A or A' so as to control movement of the deflecting gate 28 and so as to control operation of the gates 46a, 46b, 48a, 48b to control movement of the objects through the channel as with the previous embodiment.

If the distance between objects in chute 50, as detected by sensor 52, is too small, indicating that the objects traveling down the chute 50 are too close to one another so that they cannot be properly directed into channels A or A', one or more of the objects in too close a proximity to each other must be removed from the chute to prevent two objects from being deposited into an open space 14a of the conveyor. In addition, if an object traveling down the chute is too long, this indicates that two objects are probably stuck to one another. Obviously, when the separation between adjacent objects is zero, the objects are in too close a proximity to each other and the two stuck objects must be removed from the chute. Further, the reject mechanism is preferably also responsive to sensors provided at the conveyor 14 so that objects are rejected from the infeeder when there are no empty slots in the conveyor and the infeeder is full.

Object rejection is provided by a reject mechanism which preferably includes a reject gate 30, which is controlled by the microprocessor and the object separation sensor 52 and which selectively covers a reject opening 29. The reject gate 30 is provided along the outside wall 36 of channel A', and the reject opening 29 is preferably provided in outside wall 36 of channel A'. When two objects in close proximity to one another are sensed in the chute 50, gate 28 pivots to the closed position to deflect the first of the two objects into channel A or A'. Almost simultaneously, deflecting gate 30 pivots from the closed position shown in solid lines in which it is essentially coplanar with outside wall 36 and covers reject opening 29 to the deflecting position shown in phantom to deflect the object that is too close to an adjacent object through reject opening 29, out of the system and into a holding device, such as bin 42.

Alternatively, or in addition, to a length and separation sensor, a camera or other suitable device could be provided to determine the shape of objects traveling toward the infeeder, and objects which are improperly shaped could be removed by a reject mechanism which is responsive to input from the camera.

Alternatively to the configuration shown in FIG. 2, a reject opening and associated reject gate could be provided in side wall 32. With this configuration, if separation sensor 52 determines that objects are too close together, gate 28 will move to the vertical position to deflect one of the objects into channel A and the reject gate will open to deflect the object from channel A through the reject opening provided in wall 32.

This invention has been described with reference to what is currently considered to be the most practical and preferred embodiment. However, this is not meant to limit the present invention. Rather, various modifications and arrangements are intended to be included within the spirit and scope of the appended claims.

What is claimed is:

1. An apparatus for inputting objects to a conveyor system, comprising:

structure defining at least one object path having an exit therefrom with said objects moving along said object path toward said exit to said conveyor system;

optical means for optically determining a distance between mutually adjacent objects moving along said path and for optically determining a geometric parameter of said objects;

means responsive to said optical means for removing objects from said path that are separated from adjacent objects in said path by less than a prescribed minimum distance or that have a predetermined geometric parameter.

2. The apparatus of claim 1, wherein said object path comprises a chute along which said objects move toward an end thereof and at least one channel disposed so as to receive objects falling off said end of said chute.

3. The apparatus of claim 1 further including means for allowing said objects to exit said path individually through said exit and to be deposited on said conveyor system at separated locations.

4. The apparatus of claim 1, wherein said removing means comprises a gate disposed adjacent said path and operable to selectively deflect said objects that are separated from adjacent objects in said path by less than said prescribed minimum distance out of said path.

5. The apparatus of claim 1, wherein said object path comprises at least one pair of channels arranged in a mutually adjacent relationship, a reject opening being defined in one channel of each of said at least one pair of channels, said apparatus further comprises a directing mechanism associated with each pair of channels constructed and arranged to direct objects approaching said channels into one or the other channel of said pair of channels, and said removing means comprises a reject mechanism associated with each pair of channels constructed and arranged to selectively deflect objects from said one channel through said reject opening or to permit said objects to move through said one channel.

6. The apparatus of claim 1 wherein said optical means comprises a sensor disposed along said object path.

7. An apparatus as claimed in claim 6, wherein said sensor is an optical sensor.

8. An apparatus according to claim 1, wherein said optical means comprises a camera, and wherein said geometric parameter comprises a shape of said objects.

9. An apparatus for inputting objects to a conveyor system, comprising:

structure defining at least one object path having an exit therefrom with said objects moving along said object path toward said exit to said conveyor system;

an object separation measuring device constructed and arranged to determine a distance between mutually adjacent objects moving along said path, said object separation measuring device generating a reject signal only when the distance between said mutually adjacent objects is less than a prescribed minimum distance; and an object reject mechanism movable in response to said reject signal from said object separation measuring device to remove from said path objects that are separated from adjacent objects in said path by less than said prescribed minimum distance.

10. The apparatus of claim 9, wherein said object path comprises a chute along which said objects move toward an end thereof and at least one channel disposed so as to receive objects falling off said end of said chute.

11. The apparatus of claim 9, wherein said object reject mechanism comprises a gate disposed adjacent said path and operable to selectively deflect said objects that are separated from adjacent objects in said path by less than said prescribed minimum distance out of said path.

12. The apparatus of claim 9, wherein said object path comprises at least one pair of channels arranged in a mutually adjacent relationship, and said apparatus further comprises a directing mechanism associated with each pair of channels constructed and arranged to direct objects approaching said channels into one or the other channel of said pair of channels.

13. The apparatus of claim 12 wherein said directing mechanism comprises a gate pivotally mounted adjacent said associated pair of channels for movement between a first position for directing said objects approaching said pair of channels into one channel of said associated pair of channels and a second position for directing objects approaching said pair channels into the other channel of said pair of channel.

14. The apparatus of claim 12, a reject opening being defined in one channel of each of said at least one pair of channels and said object reject mechanism comprising a reject gate associated with each of said at least one pair of channels pivotally mounted adjacent said associate pair of channels so as to be moveable between a first position in which said reject gate covers said reject opening and a second position in which at least a portion of said reject gate extends into said one channel and deflects an object which contacts said portion of said reject gate from said object path through said reject opening.

15. The apparatus of claim 9 wherein said object separation measuring device comprises a sensor disposed along said object path.

16. The apparatus of claim 15, wherein said sensor is an optical sensor.

17. The apparatus of claim 9 wherein said object path has a reject opening defined therein and said object reject mechanism comprises a reject gate pivotally mounted adjacent said object path so as to be moveable between a first position in which said reject gate covers said reject opening and a second position in which at least a portion of said reject gate extends into said object path and deflects an object which contacts said portion of said reject gate from said object path through said reject opening.

18. The apparatus of claim 9, said object path comprising first and second channels arranged in a mutually adjacent relationship, a reject opening being defined in one of said first and second channels, said apparatus further comprising a gate pivotally mounted adjacent said first and second channels for movement between a first position for directing objects approaching said first and second channels into said first channel and a second position for directing objects approaching said first and second channels into said second channel, said object reject mechanism comprising a reject gate pivotally mounted adjacent said reject opening so as to be moveable between a first position in which said reject gate covers said reject opening and a second position in which at least a portion of said reject gate extends into said one of said first and second channels and deflects an object which contacts said portion of said reject gate from said one of said first and second channels through said reject opening.

19. The apparatus of claim 9, further comprising:

an object shape determining device constructed and arranged to determine shape of objects moving along said path, wherein said object reject mechanism is also responsive to said object shape determining device and constructed and arranged to remove from said path objects that are improperly shaped.

20. The apparatus of claim 9, further comprising:

an object sensing device provided at the conveyor system constructed and arranged to determine the presence of objects on the conveyor system, wherein said object reject mechanism is also responsive to said object sensing device and constructed and arranged to remove objects from said path when said object sensing device indicates that there are no open spaces on the conveyor system to receive an object from said apparatus for inputting objects to the conveyor system.

21. An apparatus for depositing objects on a conveyor, comprising:

a vertical channel feeding said conveyor;

a gate disposed adjacent said vertical channel;

a sensor for determining a distance between objects to be deposited into said vertical channel; and control means responsive to said sensor for controlling movement of said gate to deflect objects from said vertical channel that are separated from adjacent objects by less than a prescribed minimum distance.

22. A method for depositing objects on a movable belt, said method comprising the steps of:

moving objects through a channel having a terminal exit and a reject exit, a gate being disposed along said channel adjacent said reject exit, the objects moving toward said terminal exit from the channel to the movable belt;

sensing distance between mutually adjacent objects moving in the channel using a sensor disposed along the channel; and opening the gate to expose said reject opening and to deflect an object through said reject opening when the distance sensed between the object and adjacent objects in said channel is less than a prescribed minimum distance.

23. An apparatus for inputting objects to a conveyor system, comprising:

structure defining at least one object path having an exit therefrom, said objects movable along said object path toward said exit to said conveyor system;

a single optical sensor which senses both a distance between said objects and a length of said objects;

a microprocessor operatively connected with said single optical sensor; and an object reject mechanism responsive to said microprocessor, said object reject mechanism being movable to remove objects from said path that are separated by a less than a prescribed minimum distance or that have a greater than prescribed maximum length.

* * * * *